United States Patent [19]

Vaughan

[11] Patent Number: 4,654,137

[45] Date of Patent: Mar. 31, 1987

[54] MULTICOMPARTMENTED CELL WITH FREELY-EXTENDIBLE TUBULAR MEMBRANE

[76] Inventor: Daniel J. Vaughan, 36 Paxon Dr., Wilmington, Del. 19803

[21] Appl. No.: 722,947

[22] Filed: Apr. 15, 1985

[51] Int. Cl.⁴ .................. B01D 13/02; C25B 13/02
[52] U.S. Cl. .............................. 204/301; 204/260; 204/263; 204/DIG. 13
[58] Field of Search ............... 204/151, 182.3, 182.4, 204/260, 263, 301, DIG. 13

[56] References Cited

U.S. PATENT DOCUMENTS

| | | | |
|---|---|---|---|
| 3,335,079 | 8/1967 | Nellen | 204/301 |
| 4,243,501 | 1/1981 | Wright, Jr. | 204/DIG. 13 |
| 4,549,946 | 10/1985 | Horn | 204/182.4 |

FOREIGN PATENT DOCUMENTS 8000309  3/1980  PCT Int'l Appl. ............... 204/301

*Primary Examiner*—Terryence Chapman
*Attorney, Agent, or Firm*—Charles J. Tonkin

[57] ABSTRACT

A multicompartmented cell suitable for use as electrochemical and chemical reactor cells is formed with a freely-extendible tubular membrane which is a thin-walled, preferably ion selective permeable, membrane sleeve which from a dry condition tends to expand and lengthen upon hydration. An end plug fastened at one end of the membrane provides fluids closure whereby the closed membrane end with its end closure is free to move, i.e., is unattached. A cell head to which the other end of the membrane is connected, together with the membrane and the end plug define a compartment. The cell head is provided with means for ingress and egress of fluids to and from such compartment and can also be provided with electrical access to an appropriate electrode. External to the membrane sleeve is a suitable containing means spaced from the membrane to form a compartment outside the membrane, the containing means being sufficient in size to accommodate the membrane in expanded and lengthened condition. This second compartment can contain, for electrochemical process use, an appropriately spaced electrode. This means for making cells is especially applicable for cells compartmented with perfluorinated membranes that undergo large dimensional changes on hydration and drying.

11 Claims, 4 Drawing Figures

U.S. Patent    Mar. 31, 1987    Sheet 1 of 2    4,654,137
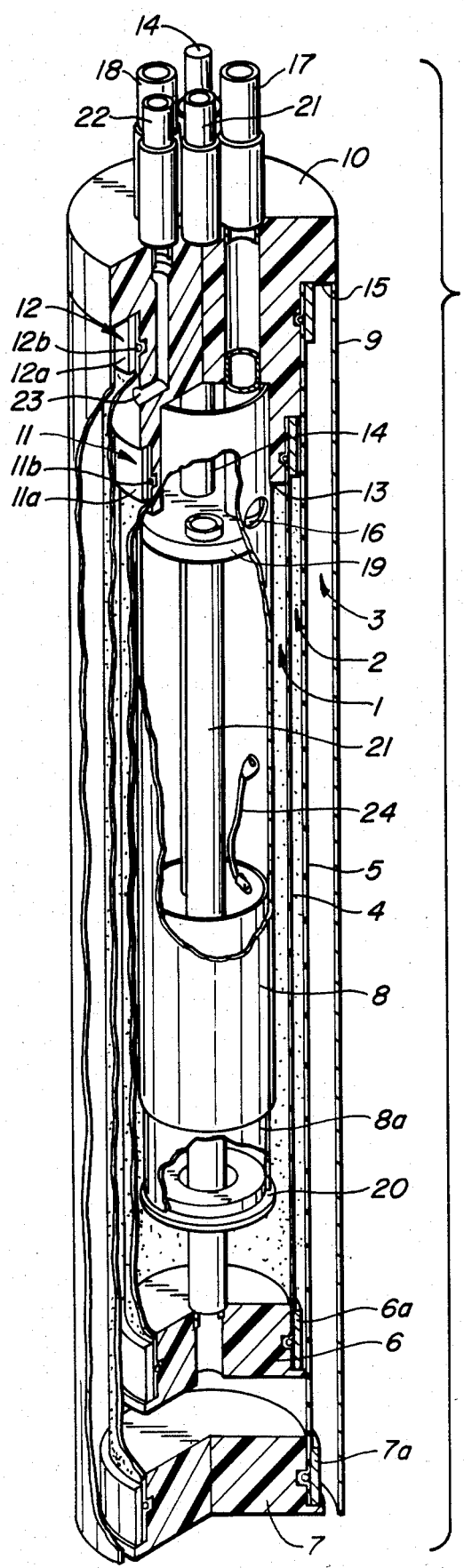
FIG._1.
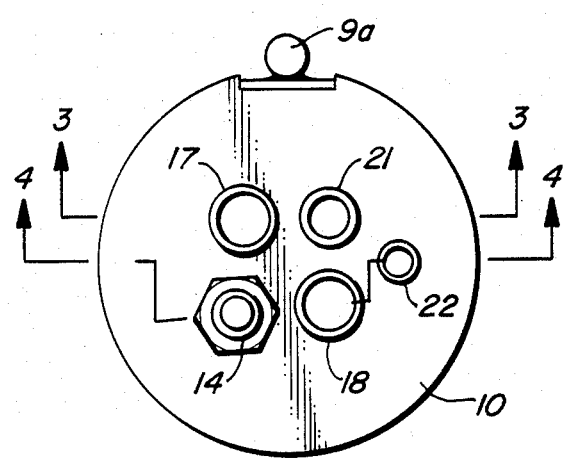
FIG._2.

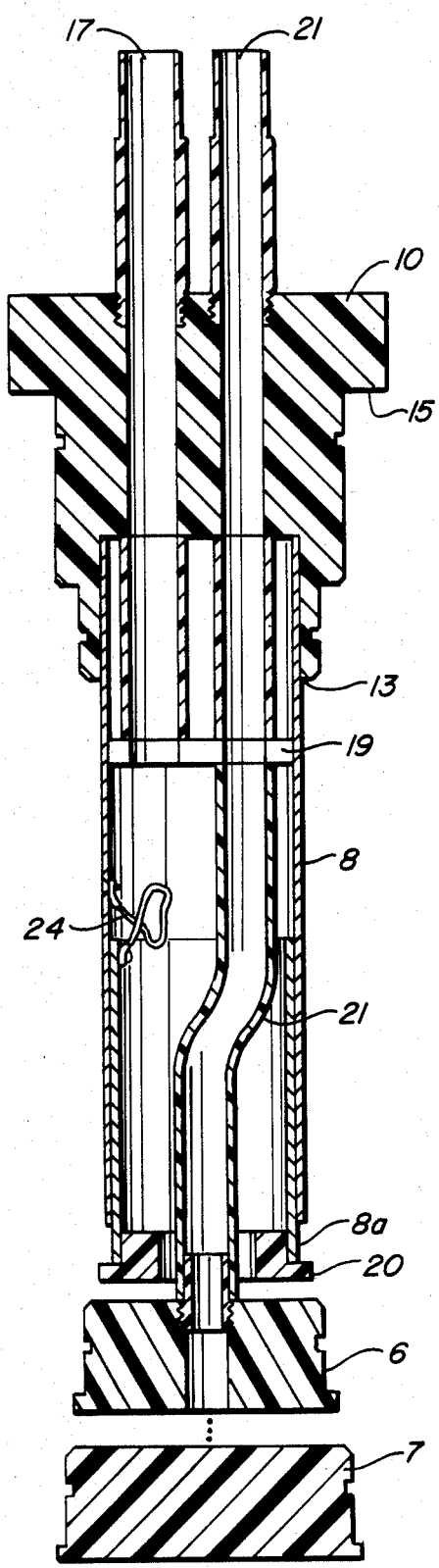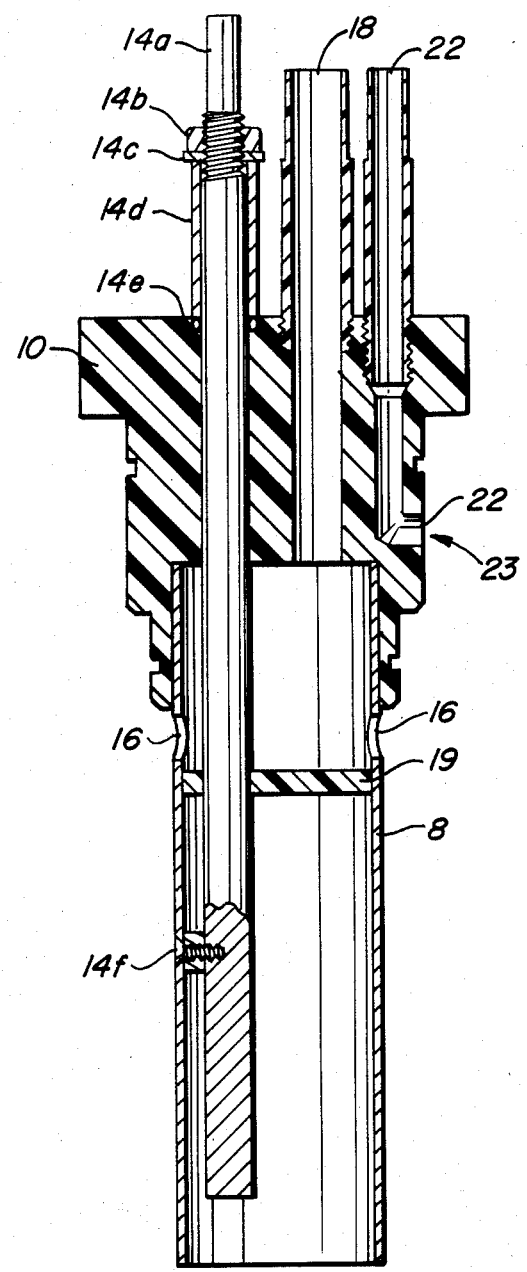
FIG._3.
FIG._4.

MULTICOMPARTMENTED CELL WITH FREELY-EXTENDIBLE TUBULAR MEMBRANE

FIELD OF THE INVENTION

This invention relates generally to electrochemical and chemical reactor cells that are compartmented by ion permeable membranes and more particularly this invention relates to a means for making cylindrical membrane cells of two or more compartments whereby the membranes can change linear dimensions on hydration and drying with controllable spacing of membranes and electrodes. The cells of this invention comprise a cell head with conduits for flow of fluids to and from compartments formed within and outside the membrane. Electrodes can be attached to the cell head for electrochemical processes. The other end of each membrane tube is fitted with an end plug or fluids closure so that the plugged end is free to move with dimensional changes of the membrane. This means for making cells is especially applicable for cells compartmented with perfluorinated membranes that undergo large dimensional changes on hydration and drying.

BACKGROUND OF THE INVENTION

Membrane electrochemical cells have been studied for several decades but with little industrial interest until the last decade. The recent interest stems primarily from the commercial introduction of perfluorinated ion exchange membranes and their use in electrolytic cells to make chlorine and caustic soda (See Chlorine Production Processes, Noyes Data Corporation, Library of Congress Catalog Card Number 81-2361 ISBN-0-8155-0842-5) and for the electrodialytic conversion of multivalent metal salts. U.S. Pat. Nos. 4,325,792 and 4,439,293 and pending U.S. patent application Ser. Nos. 568,897, filed Jan. 6, 1984 and now abandoned and 665,052, filed Oct. 26, 1984 and now allowed. The ion selective perfluorinated membranes are films and laminates of perfluorocarbon polymers containing sulfonic, carboxylic or other fixed negative charges attached to and distributed in the polymer. These polymers have the extraordinary chemical and thermal stability of perfluorocarbons, such as Teflon ® TFE resins. But where Teflon ® unmodified perfluorocarbon is one of the most hydrophobic substances known, Nafion ®, a perfluorosulfonic acid resin, is one of the most hydrophylic. The perfluorosulfonic acid resin absorbs water rapidly at room temperature, in amounts depending upon the number of sulfonic acid groups in the polymer structure, pretreatment of the resin and the electrolytic environment. On absorbing water or polar organics, the volume of the resin increases which results in an increase in the linear dimension of a film, laminate, or membrane of the resin. The linear dimensional change for an unsupported film of a perfluorosulfonic acid resin can vary from about 14% to 17% and for a fabric supported membrane from about 3 to 10% (See Perfluorinated Ion Exchange Membranes, W. F. G. Grot, G. E. Munn and P. N. Walmsley—141st Meeting The Electrochemical Society, Houston, Tex., May 7-11, 1972).

An increase in linear dimensions of a membrane that is sealed to a cell frame of fixed dimensions results in the formation of folds or creases in the membrane. Generally the membrane is spaced close to and sandwiched between the electrodes whereby the folds or creases alter fluids flow in the gap between membrane and electrodes, and if the folds are large enough they form a membrane bridge between the anode and cathode. This membrane bridge can result in electroplating metal in and through the membrane when processing multivalent metal salts the cation of which is electrodepositable on the cathode. Metal plate-through of the membrane can cause electrode arcing and rupture of the membrane. A decrease in linear dimensions of an installed membrane resulting from drying can cause rupture of the membrane and loss of fluids and electrical integrity of the electrochemical cell.

Where a membrane is between a header and a base in fixed positions, the spacing between the membrane and the electrodes must be substantial to accommodate the swelling of the membrane upon hydration so as to avoid contact of the membrane with the electrodes. An example of such an electrolysis cell with a rigidly defined ends of a membrane is shown in U.S. Pat. No. 4,006,067. However, the wide spacing required in such structure is disadvantageous in that it does not give the close spacing which results in a more efficient electrodialysis.

The perfluorinated sulfonic acid membranes used to make chlorine and caustic are preconditioned to a desired level of hydration and ionic form of the membrane and installed between the electrodes in a cell frame in the preconditioned state. Preconditioning the membranes decreases dimensional changes from the as-installed to operating conditions but the membrane must be kept hydrated at all times to prevent shrinkage and rupture of the membrane. When a preconditioned membrane is removed from the cell for reuse, it must be preconditioned to the exact state of preconditioning as first installed to obtain the initial membrane dimensions for reinstallation in the cell frame. Although acceptable cell performance can be achieved in chlorine production by installation of preconditioned membranes, the general utility of membrane cells using the preconditioning method for accommodating linear dimensional changes of membranes is very limited.

For general utility of membrane electrochemical cells, it is preferable that the cell accommodate dimensional changes in the membrane and to permit easy assembly and removal of cell components for maintenance and reuse. Preferably, the cell design would permit installation of the membrane dry at ambient conditions and provide predictable and controllable spacing of membranes and electrodes in a variety of chemical environments and operating conditions and return of the installed membrane to dry ambient conditions for cell maintenance and reuse of the membrane. Heretofore, there has been no satisfactory method for making membrane electrochemical cells which provide for large dimensional changes in the installed membrane, especially perfluorinated membranes. An object of the instant invention is to provide a method for making cylindrical type membrane compartmented electrochemical and chemical reactor membrane cells having two or more compartments that permits installation of membranes dry at ambient conditions, provides for predictable and controllable spacing of membranes and electrodes in a variety of chemical environments and operating conditions and return of the installed membrane to dry ambient conditions for cell maintenance and reuse of the membrane.

SUMMARY OF THE INVENTION

The improved cell of the present invention permits installation of the membrane tube or sleeve to form a compartment so that one end of the tube is not in fixed position and the membrane is free to change linear dimensions on hydration and drying. The improved cell is a multicompartmented cell comprising at least a thin-walled, preferably ion selective permeable, membrane sleeve which from a dry condition tends to expand and lengthen upon hydration, an end plug fastened at one end of said membrane to provide fluids closure, whereby the closed membrane end with its end closure is free to move, i.e., is unattached, and a cell head fastened in the other end of said membrane. The cell head, membrane and end plug cooperate to form a compartment within the membrane sleeve. The cell head is provided with means for ingress and egress of fluids to and from the compartment within the membrane and can also be provided electrical access to an appropriate electrode (cathode or anode) within but spaced from the membrane when the cell is used in electrochemical processes. External to the membrane sleeve suitable containing means spaced from the membrane provides a compartment outside the membrane; means for ingress and egress of fluids to and from this second compartment are provided. The second compartment can contain, for electrochemical process use, an appropriately spaced electrode.

The improved cell of the present invention avoids the fold and crease problems encountered when membranes are installed in a frame of fixed dimensions. With the present cell, the membrane can be installed dry at ambient conditions, to be hydrated with dimensional changes in a variety of chemical environments at operating conditions, and to be returned to dry ambient conditions for easy removal and reassembly. The present cell provides for predictable and controllable spacing of membranes and, where used, electrodes in the cathode and anode compartments for electrochemical processes. The provision for dimensional changes is especially advantageous with perfluorinated ion selective membranes such as perfluorinated sulfonic acid resin membranes.

A special advantage of the present invention is that it allows close spacing between the electrodes and membranes whereby lower resistance and higher electrical efficiency are obtained. Further predictable and controllable spacing of membranes and electrodes can be obtained with the thin walled membranes as they change dimensions from dry ambient conditions to hydrating operating conditions and back to dry conditions while retaining cell integrity. Heretofore there has been no satisfactory method of making membrane electrochemical cells that provides for dimensional changes of the installed membrane, especially perfluorinated membranes that undergo large linear dimensioned changes.

The foregoing advantages are obtained with a multicompartmented membrane cell having a cell head for (a) passage of fluids in cell compartments, (b) attachment, spacing, alignment and fluids closure of the electrodes, and (c) attachment, spacing and fluids tight closure of one end of each membrane tube whereby the other end of each membrane tube having a fluids tight closure is free to move with a change in the dimension of the membrane. Cells of 3 or more compartments can be formed of 2 or more concentrically spaced membranes.

A special feature of the invention comprises fitting a thin wall plastic tube over a cylindrical header and press fitting a plastic ring, smaller in inside diameter than the diameter of the header and plastic tube, over the plastic tube and header. A preferred connection comprises (a) fitting a plastic tube over a cylindrical header having a groove around the circumference of the header, (b) press fitting the wall of the plastic tube into the groove by multiwraps of a thread and (c) press fitting a plastic ring over the plastic tube, groove and header. While one groove is usually adequate, more than one groove can be used. It is preferable to use a glue or sealant between the plastic tube and header when a surface of the tubes or header is rough or irregular or when the plastic tube contains a fabric reinforcement. By selection of materials and fitting of compartments, these wall plastic tubes can be connected to cylindrical headers to effect separation of fluids up to the burst pressure of the plastic tube. The connection is easily made, removed and reused repeatedly. The connection permits close spacing of electrodes in an electrolytic cell with an electrically insulative connection.

The method and apparatus omitting the need for electrodes as in electrochemical processes are also useful in carrying various chemical reactions and separations involving the use of thin-walled ion selective membranes as in nitration processes according to U.S. Pat. No. 3,976,704; aromatic alkylation according to U.S. Pat. No. 4,316,997, sulfonation according to U.S. Pat. No. 4,308,215; oxyalkylation according to U.S. Pat. No. 4,504,685 and membrane solvent extraction according to U.S. patent application Ser. No. 114,370 filed Jan. 21, 1980, now U.S. Pat. No. 4,532,347.

BRIEF DESCRIPTION OF THE DRAWINGS

FIG. 1 is a schematic perspective view of a three-compartment electrochemical cell with parts cut away.

FIG. 2 is a plan view of the top of the cell head for a three-compartment cell.

FIG. 3 is a vertical cross-sectional view taken along the line 3—3 of FIG. 2, omitting the membranes and retaining rings, to show the conduits and a telescoping inner electrode.

FIG. 4 is a vertical cross-sectional view taken along the line 4—4 of FIG. 2, showing conduits and electrode assembly.

DETAILED DESCRIPTION OF THE INVENTION

Novel features and advantages of the present invention will become apparent to one skilled in the art from a reading of the following description in conjunction with the accompanying drawings.

A three compartment electrochemical cell in accordance with this invention is shown schematically in FIG. 1 and in more detail in FIGS. 2-4. Membrane tube 4 separating compartment 1 from compartment 2 and membrane tube 5 separating compartment 2 from compartment 3 are closed at one end by closure 6 for tube 4 and closure 7 for tube 5 and said closures or ends of membrane tubes 4 and 5 are not attached to electrode 8 in compartment 1 or electrode 9 in compartment 3. Closure 6 is not attached to closure 7 and membrane tubes 4 and 5 are free to increase dimensions on hydration and decrease dimensions on drying. The upper end of membrane tube 4 is attached to and closed by cell head 10 at seal surface 11 and the upper end of membrane tube 5 is attached to cell head 10 at seal surface 12. Electrode 8 is fitted into cell head 10 at point 13, aligned vertically with membrane seal surfaces 11 and 12 and hydraulically sealed into cell head 10 with seal assembly 14. Conduits for fluids flow through compartment 1 are conduits 17 and 18. Preferably fluids enter conduit 17 in cell head 10, pass through cell head 10, disk 19 partitioning fluids in and out of electrode 8 and ported disk 20 at the end of electrode 8, and the fluids exit between electrode 8 and membrane 4 to exit port 16 into electrode 8 and through cell head 10 and conduit 18. Preferably fluids enter compartment 2 at conduit 21, through cell head 10 and tube closure assembly 6 at the end of membrane tube 4, and exit between membrane tubes 4 and 5 to port 23 on cell head 10 and through cell head 10 and conduit 22. The assembled cell head 10 comprising electrode 8 and membrane tubes 4 and 5 is inserted into electrode 9 at surface 15 on cell head 10 and aligned with electrode 8.

It will be noted that in the illustrated embodiment disks 19 and 20 are to divert but not stop fluid flow. Disk 19 partitions the interior of electrode 8 so that fluid entering conduit 17 passes through disk 19 and is directed through disk 20 and returns above disk 19 into tubular electrode 8 and out conduit 18. Conduit 17 can be extended to the bottom end of tubular electrode 8 and attached to disk 20 to direct fluid to exit conduit 18. Disk 19 is preferable when electrode 8 is extendable and is then placed above the extending joint. Disk 20 is designed to let conduit 21 pass through the disk (without attachment) and to let fluid from conduit 17 flow through the disk. Disk 20 also serves to protect the membrane from sharp metal edges on the end of electrode 8 and helps center membrane tube 4 around electrode 8. Disks 19 and 20 are attached to electrode 8 and not to membrane 4. Conduit 20 is a flexible and extendible tube and is attached to end plug 6 of membrane 4. The power source attaches to the electrodes in a manner well known in the art and is illustrated in FIGS. 3 and 4 by contact posts or rods 9a and 14a.

In assembling the cell head to the end of the inner and outer membranes 4 and 5 (see FIG. 1), inner membrane 4 is fitted around the lower face 11 and a portion thereof is depressed into groove 11b by means of windings of perfluorocarbon thread, e.g., Teflon ®. Then ring 11a of slightly smaller I.D. than the O.D. of the cell head plus the membrane 4 is stretched and press fitted over the end of the membrane about face 11 and up against the shoulder.

Electrode 8 and its attachments can be fitted into place as shown in FIG. 1 before or after membrane 4 is attached to cell head 10.

Then (or before attaching the membrane to cell head 10) the lower end of the membrane tube 4 is closed by slipping another ring 6a over the lower end of membrane 4 and inserting end plug 6 into the lower end of the membrane. Thereafter a portion near the end of the membrane 4 is depressed into a groove in the end plug face by means of perfluorocarbon thread windings and the second ring 6a is press fitted under elastic strain over the depressed portion of membrane 4 and with the ring 6a against the shoulder.

The second membrane 5 is fastened against the upper face 12 of cell head 10 in a similar manner as with the inner membrane 4 but with the larger seal ring 12a. The lower end of the second membrane is closed and sealed with an end plug and a second ring 7a in a manner similar to the closure of the membrane 4.

As may be seen more clearly in FIG. 3, conduit 21 is preferably flexible or sufficiently bendable or coiled to move freely through ported disk 20 with dimensional changes in membrane 4. As shown, electrode 8 is preferably made up of telescoping sections 8 and extendible portion 8a with a flexible electrical connection 24 between the two sections. Extension of the electrode permits full use of the cell formed of the extended electrode and lengthened membrane.

In the arrangement shown in the figures, particularly FIG. 1, membrane 5 will swell sufficiently to allow fluid flow along the surface 12 to the port 23 to conduit 22. Preferably a groove can be cut into surface 12 to facilitate such flow; more preferable is a circumferential groove around the cell head at the level of port 23 together with multiple vertical grooves connecting the circumferential groove to fluid in compartment 2.

As shown particularly in FIG. 4, the seal assembly for electrode 8 can be an electrode connector rod 14a, connector rod nut 14b, connector rod washing 14c, connector rod spacer 14d and connector rod O ring 14e. The connector rod 14a can be electrically connected to electrode 8 at 14f within compartment 1. FIG. 4 shows the electrical connection for electrode 9. The electrodes can be connected to a power source, e.g., a rectifier, as will be readily apparent to one skilled in the art.

The cell of the instant invention can have two compartments or more than three compartments. For example, compartment 3 can be enclosed in a membrane tube with conduits for flow of fluids or compartment 3 can be a tank or vessel having an electrolyte with the cell immersed in the electrolyte. The cell can be fitted into a pipe containing an electrolyte and the cell arranged to effect gas lift and circulation of the electrolyte. The cell can be assembled into an electrolyzer of two or more cells.

As indicated above, key features of the invention reside in the combination of a single cell head in fixed position and a thin-walled ion permeable tubular membrane affixed at one end to said cell head and closed at the other end with an end plug where the end plug is free to move with the lengthening of said membrane upon hydration. These aspects of the present invention are particularly applicable for forming an electrochemical half cell adapted for use in an electroplating liquid contacting a cathode to form an electrolysis cell having an electrical charge impressed between said anode and cathode. In such half cell a cylindrical cell head in fixed position is attached to and supports one end of a tubular thin-walled cationic permeable membrane, which from a dry condition tends to expand and lengthen upon hydration. The other end of the tubular membrane is fitted with an end plug which is otherwise unattached so that the membrane with its end plug is free to expand and lengthen upon hydration. Thus, the cell head, tubular membrane and end plug form or define a compartment within the membrane. An anode, preferably an insoluble anode, extends into this compartment and can be connected to an electrical power source through the cell head. Conduits through the cell are provided for passage of fluids to and from the compartment. This arrangement allows the fluids within the compartment to be controlled. Thus, where a chromic acid electroplating solution is used in the plating bath into which this half cell is immersed, the oxygen generated at the anode will be exposed to the used electroplating acid and at least partially regenerate chromic acid. The regenerated acid, excess oxygen and other fluids can be withdrawn for further treatment and/or separation and recycle of the usable portions of the electroplating liquid. A structure for this purpose can be obtained by modification of the three compartment structure shown in the figures, by removing electrode 9, the outer membrane 5, closing the conduits 21 (or replacing end plug 6 with a solid end plug) and 22, removing the partitioning disk 19 and closing the ports 16 in electrode 8 so that there only remains membrane 4, the cell head 10, end plug 6, electrode 8 as an anode and conduits 17 and 18 for fluids circulation from within the electrode and membrane. Thus a suitable anolyte could be circulated within the membrane. Gases generated at the anode can be kept out of the catholyte outside the membrane. It will be apparent to one skilled in the art that when a two compartment cell is desired the cell head can be simpler than that shown in FIG. 1.

Where chemical reactions such as those hereinbefore mentioned are to be carried out through one or more membrane defined compartments the cell structure illustrated in the figures can be modified for such use by disconnecting or removing the electrodes.

Compartment 1 of the cell shown in FIG. 1 can be the catholyte compartment and electrode 8 the cathode. Alternatively compartment 1 can be an anolyte compartment with electrode 8 as the anode. Compartment 2 can be a feed or reactor compartment. Various arrangements can be made with compartment 3 as the catholyte compartment and electrode 9 as the cathode, or compartment 3 can be the anolyte compartment and electrode 9 the anode.

The arrangement of conduits for flow of fluids and the direction of flow of fluids as shown in FIG. 1 can vary depending on the fluids and requirement of the electrochemical process. For example, a fluid can enter compartment 2 at conduit 22 and exit at conduit 21 or a fluid can enter compartment 2 through tube closure 7 and exit at conduit 21 or 22 or both. Fluids can enter compartment 1 at conduit 18 and exit at conduit 17 or the disk 19 partitioning electrode 8 for inlet and outlet of fluids can be replaced by a conduit extending to the end of electrode 8. Many variations in the number, arrangement and functions of the cell compartments and the arrangement of conduits for flow of fluids and direction of flow of fluids will be apparent to one skilled in the art.

The materials that can be used in the cells of this invention are not critical. Cell components can be made of metals, ceramics, plastics and material composites suitable for use in an electrochemical environment. Preferably, the materials are easily fabricated into cell components that are suitable for long-term use and are easy to assemble and remove for maintenance and reuse. A perfluorocarbon polymer, such as Teflon ® TFE resin, is a preferred material for the cell head and closure for the membrane tubes because it is exceptionally stable in electrochemical environments, a good electrical insulator, easily fabricated into cell components and suitable for use at elevated temperatures. Perfluorinated sulfonic acid membranes, such as Nafion ®, are preferred for compartmenting the cell for use in corrosive and oxidizing environments. Preferably, the conduits for fluids are made of halocarbon or hydrocarbon polymers that are electrical insulators and chemically stable in the electrochemical environment. The anode materials can be soluble or insoluble in a solid or foraminous structure. Useful are ceramic anodes of a reduced titanium dioxide and titanium and tantalum metal anodes comprising coatings of iridium, platinum, ruthenium metals and oxides of metals perform well as insoluble anodes which anodes are commercially available. The cathode material can be any solid or foraminous structure of metal, ceramic, carbon, plastic or composite of materials that is electrically conductive and suitable for use in the electrochemical environment. The electrodes can be of a fixed dimension or adjustable in dimensions.

The cell head of the cells of this invention can vary in size and configuration. The configuration of cell head 10 as shown in FIG. 1 provides a means to (a) assemble and remove cell components easily for maintenance and reuse, (b) attach, align, and fluids close electrode 8, (c) space, attach and fluids close one end of membrane tube 4 and membrane tube 5, (d) pass fluids in cell compartments and (e) attach and align electrode 9. Other cell head configurations will be apparent to one skilled in the art. For example, it is preferable that the cell head configuration provides a means to fit one end of electrode 8 snugly into one end of the cell head to a depth greater than the height of seal surface 11 for attachment of the membrane tube but the cell head configuration could provide a means to fit one end of the cell head into one end of electrode 8 to achieve the same purpose. The cell configuration could provide a means to insert the cell head comprising electrode 8 and compartmenting membranes into one end of electrode 9 so that electrode 9 extended above the cell head instead of terminating at a ledge on the cell head as shown in FIG. 1. These and other variations in the cell head will be apparent to one skilled in the art.

The membrane tube compartmenting the cell can be attached to the cell head and to an end plug closure to provide a fluids tight cell compartment by using sealants, clamps, tapes, O rings and the like but preferably the tubes are attached and fluids sealed with a special closure means as disclosed and claimed in my copending application, Ser. No. 722,948, filed concurrently herewith and still pending, and incorporated herein by reference. Such preferred means comprises a cylindrical head seal surface or cell head adapted to fit snugly within an end of a membrane tube, said head seal surface preferably having (spaced from its end) a circumferential groove or a depression with a winding about the membrane tube for depressing the tube into the circumferential groove and a ring outside the tube and over the portion thereof depressed into the groove and tightly fitting around the tube end and end plug or head seal surface whereby the ends of the membrane tube are fastened with a fluids tight closure to the end plug or cell head and with the plugged end freely movable, i.e., unattached, to accommodate the lengthening of the membrane tube upon hydration.

The cell head or header of such connector assembly is most conveniently cylindrical and of dimensions to fit into the membrane sleeve or similar thin-walled plastic tube. In this preferred closure aspect of the invention, the header can be a pipe, a solid cylinder, a cylinder with conduits for flow of fluids or a cylindrical header with conduits for flow of fluids, electrode and other assemblies. The header can be of plastic, ceramic or metal with or without fillers and reinforcements. The preferred headers are substantially chemically stable to the process conditions, mechanically and chemically suitable for economical design and operation of the processes. The preferred header for strong oxidizing media in electrochemical cells are perfluorocarbon headers, such as Teflon, that is shaped to fit the inside dimensions of the selected plastic tube.

It will be apparent that since gases are usually formed at the electrodes, the electrodes and electrochemical cells are generally positioned so that gases can rise and exit the cell. Usually liquid generally flows cocurrent with the gases. The cells of this invention are generally positioned with the membrane or membranes in a vertical position. The cells can be operated in a horizontal position and the membranes aligned by differential pressures in the compartments. Foraminous or other inert porous spacers can be used to hold the membranes away from the electrodes. In some cases, an inert plastic netting can be used, as for example, to space electrode 9 from membrane tube 5. It is usually more desirable to avoid spacers.

The thin walled tubes or sleeves used as the membranes preferably have ion permeable selectivity, most preferably cation permeable selectivity and should be sufficiently thin for efficient selectivity consistent with adequate strength. The membranes of most significance are those that undergo substantial dimensional changes (such as at least 2%, more importantly more than 5 or 10%) when going from ambient dry conditions to hydrated conditions in aqueous solutions, such as electroplating baths and the like. The preferred tubes are perfluorocarbon membrane tubes suitable for use in electrolytic cells, fluids separators and chemical reactors and are membrane tubes ranging in thickness from about 0.001 inches to about 0.030 inches and in diameter from about 0.2 inches to about 12.0 inches, as measured under ambient dry conditions.

To illustrate the invention an electrochemical cell as shown in FIG. 1 was made as follows. Cell head 10, end plugs 6 and 7 and seal rings for membrane closures 11, 12, 6 and 7, disk 19 and 20 were made of Teflon ® TFE resins. Membrane tubes 4 and 5 were tubes of Nafion ® perfluorinated sulfonic acid membrane 427. Conduits 18 and 17 were $\frac{3}{8}$" schedule 80 PVC pipe, and conduits 21 and 22 were $\frac{1}{4}$" schedule 80 PVC pipe except a flexible tube was used for conduit 21 from spacer disk 19 to end plug 6. Electrode 8 was a copper tube and electrode 9 a titanium mesh with an iridium oxide coating. The cell components were fabricated to the following dimensions (all dimensions in inches). Cell head 10 was machined from a rod 4 diameter×4 length with one end of the rod bored to a depth of 1.5 and diameter of 2.125 for attachment of electrode 8 having an O.D. of 2.125. Seal surface 11 was 2.530 diameter×1.0 height with circumferential groove 0.125 wide×0.080 deep, and seal surface 12 was 3.005 diameter×1.0 height with groove 0.125 wide and 0.080 deep. The surface for attachment of electrode 9 was 3.375 diameter×0.50 height. End plug 6 was 2.530 diameter×1.0 height with circumferential groove 0.125 wide×0.080 deep, and end plug 7 was 3.005 diameter×1.0 height with groove 0.125 wide×0.080 deep. Seal rings 6a and 11a for membrane tube 4 (seal surface 11 and end plug 6) were 2.540 inside diameter×1.0 height×0.114 wall thickness. Seal rings 7a and 12a for membrane tube 5 (seal surface 12 and end plug 7) were 3.015 inside diameter×1.0 height×0.114 wall thickness. Spacer disk 19 was 1.985 diameter×0.25 height and disk 20 was 2.00 diameter and 0.30 height for inside of electrode 8 and 2.40 diameter×0.20 height for spacing membrane from end of electrode 8. Electrode 8 was a copper tube 2.125 outside diameter×25.5 length with 0.50 copper rod buss. Electrode 9 was 3.375 inside diameter×34 length. Membrane tube 4 was 2.50 inside diameter×0.017 wall thickness×26.5 length at 50% relative humidity and 25 degrees C. Membrane tube 5 was 3.0 inside diameter×0.017 wall thickness×31 length at 50% relative humidity and 25 degrees C.

Electrode 8 was fitted in cell head 10 (with flow conduits and disk 19 attached to cell head) attached and fluids sealed to cell head 10 by seal assembly 14 using an O ring seal. Cell head 10, electrode 8 and conduits assembly is positioned into membrane 4 to connect conduit 21 tube to end plug 6 and seal the ends of membrane tube 4 to end plug 6 and seal surface 11. Membrane tube 5 is closed by end plug 7 and seal surface 12. The cell head assembly is fitted into electrode 9 to complete assembly of the three compartment cell.

Water at 80 degrees C. was circulated through cell compartments 1 and 2 to hydrate the membranes and to measure changes in the dimensions of the cell compartments. After ten minutes of hydration, membrane tube 4 had increased in diameter from 2.5 to 2.7 and in length from 26.5 to 28.3. Membrane tube 5 increased in diameter from 3.0 to 3.3 and in length from 31.0 to 33.2. There was no further change in dimensions of the membranes after one hour of hydration at 80 degrees C. Water was then removed from the cell and the membranes dried with air at about 5% relative humidity and 60 degrees C. The membranes shrank to their installed dimensions in about 10 minutes and to less than the installed dimensions on further drying. The membranes were hydrated and dried several times with similar results. There was no folding or creasing of the membranes on hydration and drying or loss in cell compartmentation.

The assembled cell was used to remove metal cation impurities from a chromic acid plating liquor. The cell was mounted in a plating tank comprising a standard chromic acid plating liquor of about 32 ounces/gal. of chromic acid, a sulfuric acid catalyst and metal cation impurities, such as copper, iron, calcium, sodium and nickel, at a temperature of 60° C. An aqueous solution of about 5% sodium sulfate and 1% sodium hydroxide was circulated through compartment 2 and 5% solution of sodium hydroxide was circulated through compartment 1. The electrodes were connected to the direct current supply so that electrode 8 was the cathode, electrode 9 the anode, compartment 1 the catholyte compartment and compartment 2 a reactor compartment, chromic acid the anolyte and the plating tank the anolyte compartment. After five hours of operating, the cell was removed from the chromic acid tank and the dimensions of the membranes determined. The length of membrane tube 5 was 32.5 and membrane tube 4 about 27.5. The tubes were free to change dimensions. The cell was returned to operation, operated continuously for one month, and removed from the plating liquor (the dimensions of the membranes tubes were essentially those after 5 hours of operation). The assembled cell was washed with water and allowed to dry at ambient conditions whereby the membrane tubes returned to substantially the dimensions as first installed. There was no loss of cell compartmentation or fluids integrity and the membranes were free of folds, creases and metal deposits.

Electrode 9 was removed from the cell above and then membrane tube 5 and its plug 7 were removed. Electrode 9 was reassembled to form a two compartment cell comprising electrode 8, membrane tube 4 and electrode 9. The two compartment cell was used to remove metal cations from the chromic acid plating liquor with electrode 8 as the cathode and electrode 9 as the anode and an aqueous solution of sodium carbonate and sodium sulfate as the catholyte. After two weeks of operation, the cell was removed from the plating liquor (the diameter of membrane tube 4 was 2.75 and the length 27.8) washed with water, dried at ambient conditions and electrode 9 and membrane tube 4 removed from the cell head. The cell components including membrane tube 5 were used to reassemble the initial three compartment cell. The reassembled cell was essentially the same as the initial cell in dimensions, fluids integrity and performance.

Similar results were obtained when making cells of this invention using different dimensions, membranes, anodes and operation of the cells in a variety of electrochemical environments. The results show that the components of the cell of this invention are easily assembled into cells of two or more compartments whereby membranes compartmenting the cell can change dimensions on hydration or drying with controllable and predictable compartmentation and spacing of cell components, and that the cell components can be easily removed for maintenance and reuse.

I claim:

1. A multi-compartmented membrane cell comprising:
    a cell head,
    one or more thin-walled membrane tubes which from a dry condition expand and lengthen upon hydration,
    an end closure for each of said membrane tubes,
    and means spaced from said membrane tubes for containing fluids external to said membrane tubes, said containing means being sufficiently long to accommodate said membrane tubes in expanded and lengthened condition when hydrated,
    said membrane tubes being attached at one end to said cell head and at the other end to said end closure, said cell head, membrane tubes and end closure forming and defining a compartment within said membrane tubes, whereby said membrane tubes are free to expand and contract with changes in hydration,
    said containing means forming with said membrane tube and cell head a compartment external of said membrane tube,
    said cell head being provided with means for passage of fluids to and from said compartment within each membrane tube,
    and means for passage of fluids to and from said containing means external of each said membrane tube.

2. The membrane cell of claim 1 wherein said cell head has a cylindrical portion which is fitted within one end of said membrane tube, and a plastic ring under elastic strain surrounds the end portion of the membrane tube to form a fluid tight seal against said cylindrical portion of said cell head.

3. The membrane cell of claim 1 wherein the membrane tube is a flexible tube which is fitted at one end to a cell head having a cylindrical portion inserted into said membrane tube and a cylindrical end closure at the other membrane tube end, both said cylindrical portion and said end closure having circumferential grooves into which are depressed the respective end portions of said membrane tube by means of windings of plastic thread, and plastic rings under elastic strain press fitted about the repsective end portions of the membrane tube and over the depressed portions thereof.

4. The membrane cell of claim 1 wherein said cell head is adapted to be in a fixed position and each said end closure with the end of the membrane tube to which said closure is attached are free to move with changes in dimensions of said membrane tube.

5. A multi-compartmented electrochemical cell comprising:
    a cell head;
    one or more thin-walled selectively ion permeable membrane tubes which from a dry condition expand and lengthen upon hydration,
    an end closure for each said membrane tube, which is otherwise unattached so that the membrane tube is free to move with changes in dimensions of said membrane tube,
    means spaced from said membrane for containing fluids external to said membrane tubes, said containing means being sufficiently long to accommodate said membrane tube in expanded and lengthened condition when hydrated,
    said membrane tubes being attached at one end to said cell head and at the other end to an end closure, said cell head, each membrane tube and each end closure forming a compartment within said membrane tube,
    said containing means forming with a membrane tube and said cell head a compartment external of said membrane tube,
    said cell head being provided with means for passage of fluids to and from said compartments,
    electrode means within each of two said compartments to act as anode and cathode,
    and means for impressing an electrical charge between said electrodes.

6. The electrochemical cell of claim 5 wherein said membrane comprises a perfluorocarbon sulfonic acid polymer.

7. The electrochemical cell of claim 6 wherein said cell head and said end closures are made of a perfluorocarbon polymer.

8. The electrochemical cell of claim 5 wherein each said membrane is composed of perfluorinated polymer membrane permeable to cations.

9. The electrochemical cell of claim 5 having a single cell head adapted to remain in a fixed position, two of said membrane tubes concentrically spaced, said electrode within the innermost compartment formed with said innermost membrane tube being tubular, flexible conduit means connected through said cell head, said tubular electrode and said end closure of said innermost membrane tube to permit fluid flow therethrough to the compartment external to said innermost membrane tube without restricting the lengthening of said innermost membrane, and means for extending said tubular electrode to or near the end of said innermost membrane tube when it is lengthened upon hydration, said combination forming a three compartment electrochemical cell.

10. An electrodialkysis cell having an ion selective membrane sleeve or tube,
    end cap means inserted into one end of said membrane sleeve, which cap means is otherwise unattached so that said membrane sleeve is free to expand or contract upon changes in hydration,
    head means inserted into the other end of said membrane sleeve,
    an anode and cathode and means to impress an electric current between said anode and cathode,
    one of said anode and cathode projecting through said head into the interior of said membrane sleeve,
    the other of said anode and cathode being positioned on the other side of said membrane sleeve,
    means for ingress and egress of fluid to the interior of said membrane sleeve, means for containing liquid surrounding said membrane sleeve and accommodating said external electrode, said end cap means and said head means being fastened to said membrane sleeve and comprised of a cylindrical male part placed inside an end of said membrane sleeve and a ring outside the sleeve end and tightly fitting around the end of the member sleeve and male part, said male part having a circumferential groove, a winding of perfluorocarbon polymer thread to depress a portion of said membrane sleeve near its end into the groove and which is sealed by said tightly fitting matching ring, and means for ingress and egress of fluid to the compartment external to said membrane sleeve.

11. An electrochemical anodic half cell adapted for use in an electroplating liquid contacting a cathode to form an electrolysis cell, comprising a cylindrical cell head in fixed position, a thin-walled cationic permeable membrane tube, one end of which is fitted to and supported by said cell head, which membrane tube from a dry condition tends to expand and lengthen upon hydration, a cylindrical end plug fitted to the end opposite to the supported end of said membrane tube and otherwise unattached, said head, membrane tube and plug defining a compartment with said membrane tube being free to expand and lengthen upon hydration, said cell head being provided with conduit means for passage of fluids to and from said compartment formed within said membrane tube, and an anode extending into said compartment within said membrane tube.

* * * * *